(12) United States Patent
Sundholm et al.

(10) Patent No.: US 9,079,751 B2
(45) Date of Patent: Jul. 14, 2015

(54) SYSTEM FOR CONTROLLING ELEVATORS BASED ON PASSENGER PRESENCE

(75) Inventors: Göran Sundholm, Tuusula (FI); Palle Stevn, Espoo (FI)

(73) Assignee: ELSI TECHNOLOGIES OY, Vaanta (FI)

( * ) Notice: Subject to any disclaimer, the term of this patent is extended or adjusted under 35 U.S.C. 154(b) by 782 days.

(21) Appl. No.: 13/387,672

(22) PCT Filed: Jul. 12, 2010

(86) PCT No.: PCT/FI2010/050592
§ 371 (c)(1),
(2), (4) Date: Jan. 27, 2012

(87) PCT Pub. No.: WO2011/012768
PCT Pub. Date: Feb. 3, 2011

(65) Prior Publication Data
US 2012/0125719 A1    May 24, 2012

(30) Foreign Application Priority Data
Jul. 28, 2009   (FI) ..................................... 20095813

(51) Int. Cl.
*B66B 1/34* (2006.01)
*B66B 1/24* (2006.01)
*B66B 3/00* (2006.01)

(52) U.S. Cl.
CPC ............. *B66B 1/3476* (2013.01); *B66B 1/2458* (2013.01); *B66B 3/00* (2013.01);
(Continued)

(58) Field of Classification Search
CPC ...... B66B 1/3476; B66B 1/2458; B66B 3/00; B66B 3/006; B66B 2201/102; B66B 2201/211; B66B 2201/212; B66B 2201/214; B66B 2201/215; B66B 2201/216; B66B 2201/222; B66B 2201/40
USPC .......................... 187/247, 380–388, 391–393
See application file for complete search history.

(56) References Cited

U.S. PATENT DOCUMENTS 3,543,883 A * 12/1970 Kuzara ........................... 187/392
4,800,386 A * 1/1989 Kulju et al. ..................... 342/61
(Continued)

FOREIGN PATENT DOCUMENTS

FI           108106 B      11/2001
WO      WO 98/39751 A1     9/1998
(Continued)

*Primary Examiner* — Anthony Salata
(74) *Attorney, Agent, or Firm* — Birch, Stewart, Kolasch & Birch, LLP

(57) ABSTRACT

A system for controlling the elevators in an elevator system based on passenger presence. The elevator system includes a number of elevators (1A ... 1H) wherein first sensor members (2, 2A ... 2H), second sensor members and additional sensor members are arranged in a waiting area of each elevator (1A ... 1H) on each floor (F, F1, F2, F3 ... Fn). The first, second and additional sensor members are fitted to give information about the presence and number of passengers waiting to go either up or down for an elevator at least in the waiting area in question. A controller is provided for controlling the elevators. The controller receives information from the first, second and additional sensor members about the presence and number of passengers waiting for an elevator and to control the movement of the elevators of the elevator system utilizing the information received from the first, second and additional sensor members.

20 Claims, 4 Drawing Sheets

(52) U.S. Cl.
CPC .......... *B66B 3/006* (2013.01); *B66B 2201/102* (2013.01); *B66B 2201/211* (2013.01); *B66B 2201/212* (2013.01); *B66B 2201/214* (2013.01); *B66B 2201/215* (2013.01); *B66B 2201/216* (2013.01); *B66B 2201/222* (2013.01); *B66B 2201/40* (2013.01)

(56) References Cited

U.S. PATENT DOCUMENTS

| | | | | |
|---|---|---|---|---|
| 4,874,063 A * | 10/1989 | Taylor | | 187/391 |
| 4,951,786 A * | 8/1990 | Haraguchi | | 187/392 |
| 5,387,768 A * | 2/1995 | Izard et al. | | 187/392 |
| 5,487,451 A * | 1/1996 | Hughes et al. | | 187/392 |
| 5,511,635 A * | 4/1996 | Kameli | | 187/392 |
| 6,257,373 B1 * | 7/2001 | Hikita et al. | | 187/392 |
| 6,339,375 B1 * | 1/2002 | Hirata et al. | | 340/541 |
| 6,357,554 B1 * | 3/2002 | Valk et al. | | 187/391 |
| 6,672,431 B2 * | 1/2004 | Brand et al. | | 187/382 |
| 7,079,669 B2 * | 7/2006 | Hashimoto et al. | | 382/118 |
| 7,140,469 B2 * | 11/2006 | Deplazes et al. | | 187/316 |
| 7,712,586 B2 * | 5/2010 | Legez | | 187/391 |
| 8,020,672 B2 * | 9/2011 | Lin et al. | | 187/392 |
| 8,439,169 B2 * | 5/2013 | Iio et al. | | 187/387 |
| 8,584,811 B2 * | 11/2013 | Kuoppala et al. | | 187/392 |
| 8,857,569 B2 * | 10/2014 | Friedli | | 187/384 |
| 2008/0202251 A1 * | 8/2008 | Serban et al. | | 73/780 |
| 2008/0238433 A1 | 10/2008 | Joutsenoja et al. | | |

FOREIGN PATENT DOCUMENTS

| | | |
|---|---|---|
| WO | WO 2005/020171 A1 | 3/2005 |
| WO | WO 2005/093678 A1 | 10/2005 |
| WO | WO 2005/118452 A1 | 12/2005 |
| WO | WO 2006/003245 A1 | 1/2006 |
| WO | WO 2008/068387 A1 | 6/2008 |

* cited by examiner

SYSTEM FOR CONTROLLING ELEVATORS BASED ON PASSENGER PRESENCE

BACKGROUND OF THE INVENTION

The invention relates generally to an elevator system, to controlling elevators and to directing passengers in connection with an elevator system.

Nowadays elevators are typically used as a group of a number of elevators e.g. in high-rise buildings or in buildings or vessels in which large amounts of passengers are transported. These types of vessels are, for instance, passenger ships, such as cruise liners. These comprise various challenging situations from the viewpoint of the operation of the elevators. Typically these types of situations are those in which a large crowd of people wants to move from a certain deck/floor to a large number of different floors/decks in a short space of time. This is the type of situation e.g. when passengers arrive on board a vessel and when they move from the entrance deck to the cabins. On the other hand, a corresponding situation is e.g. dinnertime on cruise liners, when a large crowd of people wants to move to the dining room, which in large vessels can comprise a number of floors and have a capacity of several thousand people. In very large cruise liners the capacity can even exceed 5,000 people. In this case, on the one hand it is desired to get elevator users effectively transferred to the destination they want and also on the other hand to utilize the available elevator capacity to its maximum. The available elevator groups, each consisting of a number of elevators, can be situated at a distance from each other, in which case there is often a danger in peak traffic situations that the capacity of different elevator groups will be distributed unevenly, and that it will not be possible to utilize their capacity maximally.

Even if it were planned that passengers would use two different elevator groups, passengers may collect to use mainly only one elevator group, which could cause congestions. The movements and destination floors of users are difficult to estimate reliably with prior-art solutions, so that predicting the utilization rate of elevators is awkward.

On the other hand, during quieter times it is not always possible to control the elevators of an elevator group in the most efficient way, optimizing the energy needed for conveying passengers. This is because, among other things, it has typically not been possible in the system to monitor the numbers of passengers waiting for an elevator on the different floors. On the one hand the system has not been able to direct passengers to the correct elevator of an elevator group in a sufficiently effective manner, and on the other hand it has not been possible in the system to take into account situations in which a passenger, or passenger group, that has given an elevator call has become tired of waiting for the elevator and chosen the stairs, in which case the elevator might unnecessarily stop at that floor from which the elevator call was given. Unnecessary stopping and starting, especially upwards, consumes energy, the efficient use of which is, of course, one goal of a modern elevator system.

The aim of the invention is thus to achieve a new type of solution, by means of which the problems of prior art can be avoided. One aim of the invention is to achieve a solution, by means of which, by utilizing the elevator system efficiently, a large crowd of passengers can be moved by minimizing the call time and/or the travel time. On the other hand, another aim is to direct passengers efficiently to the different elevators of an elevator system or to different transport appliances. Further, another aim according to the invention is to achieve a solution, by means of which an elevator system can be controlled in an energy-efficient manner at least when passenger amounts are small.

BRIEF DESCRIPTION OF THE INVENTION

The invention is based on a concept wherein at least one sensor is arranged in the elevator lobby in front of the elevators on different floors, which sensor identifies the amount of passengers that are waiting for an elevator. Furthermore, an aim in the invention is to direct passengers by means of a direction system in an optimized manner to an elevator according to the direction of travel of the passenger. Yet another aim is to achieve a solution in which it is endeavored to perform the travel event of passengers by optimizing the use of energy.

The solution according to the invention has a number of significant advantages. According to the invention, by using a sensor, more particularly a capacitive sensor, in front of the elevators of an elevator group, information is obtained about the passengers waiting for an elevator on each floor. By linking information data about which direction (up or down) the passengers are going and the capacity data of the elevators in conjunction to this, and by directing the passengers, an effective solution for the control of an elevator system, and the maximization and/or the optimization of its capacity, as well as for the optimization of the energy and/or the required power, is achieved.

The method and the system according to the present invention effectively reduce congestion in an elevator system and also reduce the travel times of passengers by offering guidance to the best route option at that moment in time. Since passengers are distributed better (more evenly), the capacity of the appliances of the elevator system can be utilized more efficiently than before. That being the case, the maximum capacity of the elevators can be reduced and the efficiency of the transport systems improved.

In addition the travel times and waiting times become shorter for passengers, in which case the system also reduces the frustration of passengers and improves travel satisfaction. One advantage of the invention is also that a passenger can be guided to a suitable transport appliance according to the capacity of the system, in which case the total travel time used by the passenger becomes shorter than before.

BRIEF DESCRIPTION OF THE FIGURES

In the following, the invention will be described in detail by the aid of some embodiments with reference to the attached drawings, wherein.

DETAILED DESCRIPTION OF THE INVENTION

Figure 1:
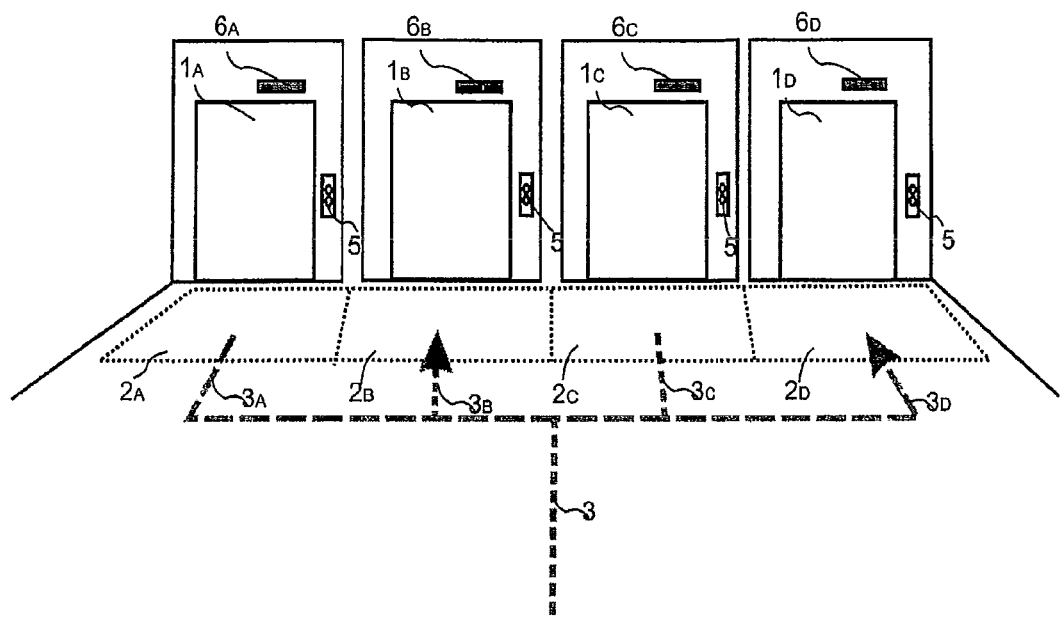
FIG. 1 presents a simplified view of an arrangement of the solution according to the invention.

FIG. 1 presents one embodiment of the solution according to the invention in connection with an elevator group, in which the entrances of the elevators 1A, 1B, 1C, 1D of the elevator group are side by side on the floor. Sensors 2A, 2B, 2C, 2D are arranged in front of the elevators, which sensors are arranged e.g. on the floor or on the ceiling. The sensors are typically of the type that they can give information about the number of people that are in front of the elevators. One preferred sensor type is a capacitive sensor, which can be arranged under the floor surface. According to one embodiment, it can also be used under e.g. the ceramic tiles of a tiled floor.

FIG. 1 also presents an arrangement for guiding passengers, which comprises at least a light-source band 3. The light-source band 3 comprises in the figure the light-source band sections 3A, 3B, 3C, 3D, which lead to the proximity of the different elevators 1A, 1B, 1C, 1D. The light-source band is of the type that the properties of it, such as the color it shows, can be changed in a controlled manner. At least two states can be achieved for the light-source band 3, or for a part of it. A dynamic state, in which the light sources 30 are lit and extinguished such that an impression of movement is brought about. In this case a person, who when he/she sees the impression of movement brought about by means of the light sources of the light-source band, is guided in the direction of travel of the "movement" of the light-source band 3. Typically the impression of movement is brought about by controlling the light sources in groups, in which movement is indicated by lighting the next light source and correspondingly extinguishing the previous one. The light sources are arranged/connected into a band, more particularly a conductor band, wherein they are controlled in the manner described above. In this case an impression of movement is achieved with the light sources, i.e. by "running" the light, and the aforementioned impression of movement is achieved for the distance of at least a part of the light-source band 3, typically for the distance of the whole light-source band. The "moving" light of the light band 3, in the first state, i.e. the dynamic state, is produced typically e.g. from a group of three light sources, in which the light of one light source is switched on and the two others are switched off. Movement is created when the next is lit (switched on) and the previous one is extinguished (switched off). The light-source bands 3 can be connected consecutively one after the other, in which case the impression of movement can continue from one light-source band to the next. The speed of the movement brought about with the light can, if so desired, be adjusted and also the direction of it can be changed.

Figure 1A:
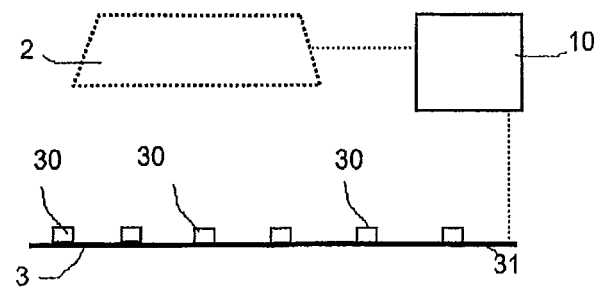
FIG. 1a presents a simplified view of a part of the solution according to the invention as a simplified diagram.

The light-source band 3, or at least a part of it, also has another state, a static state, in which the light sources of the band, or a part of the band, show light. Typically static added light is achieved such that all the light sources in at least one light-source band 3, or in at least a part of a light-source band, are switched to show light simultaneously. The light-source band can be controlled to change state between a dynamic state and a static state. The light-source band can also have other operating modes. In one preferred embodiment the color of the light shown by the light source can be changed. FIG. 1a presents one light-source band 3. The light sources 30 can be preferably e.g. light-emitting diodes, i.e. LED light sources, which are fixed to a conductor band 31, e.g. to the conductor band presented in publication FI 108106 B.

The light sources are typically controlled with a control system 10, in which case the control system receives signals from one or more sensors 2 connected to it. The control system 10 is described as a single entity in FIG. 1a. Typically a light-source band has its own control system, which is connected physically or programmatically to the control system of an elevator system and/or to the control system of a sensor 2.

The sensor 2 is typically a planar electrode sensor. Planar electrode sensors can be used e.g. in floor constructions to electrically monitor the movements and locations of a person, such as of a passenger, as is described e.g. in publication WO2005/020171A1. This type of sensor can be used e.g. to monitor people in a room, such as in a lobby space, particularly their movements and possibly also their vital functions. Publication WO 2006/003245A1 presents one sensor construction for detecting an electrical field, wherein the sensor is in web form and comprises sequential electrically conductive areas. The electrically conductive areas are typically metallic, and they can be formed on a substrate, e.g. as printed layers, laminated layers, etched layers, or films. The metal is typically aluminum or copper, as is disclosed in publication WO2008/068387A1. The sensor web according to the publication in question can be manufactured by laminating a metal foil to a release web, after which the electrically conductive areas and the foil-type connection leads in connection with them are stamped out of the metal foil. After that a protective layer is laminated onto the electrically conductive foil-type areas and connection leads, the release web is removed and a backing film is laminated to replace the release film. The manufacturing method in question can be applied also to the types of sensor webs that comprise two or more superimposed layers. In that case the first layer can comprise conductive areas and their leads, and the second layer e.g. RF loops and their leads. The sensor web comprises an output connection for connecting it with a connection cable to the control electronics for supplying measuring voltages and control signals via the connection in question.

Figure 2:
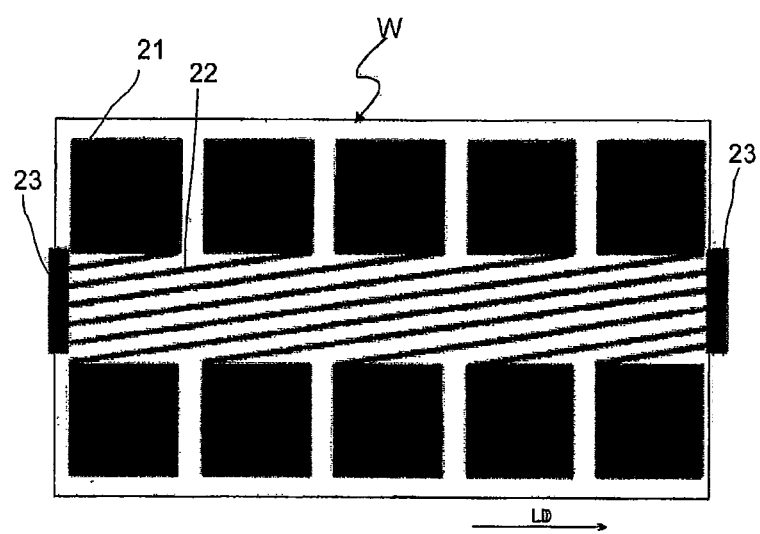
FIG. 2 presents a simplified view of a device applicable in the solution according to the invention.

FIG. 2 presents a prior-art planar sensor foil construction according to WO 2008/068387A1, comprising a sensor web W, which can be used to monitor electrically conductive points, e.g. the movements and position in a room of a person, by means of capacitive detection. The sensor web W comprises sequential and parallel conductive foil areas 21 in two rows as viewed in the longitudinal direction LD. There are also foil-type connection leads 22 between them, which leads connect the electrically conductive areas 21 in the upper row to the output connector 23 on the left, and in the lower row to the output connector 23 on the right. The conductors 22 are side by side, straight and parallel and they form a small angle with respect to the longitudinal direction LD. From these output connections the foil construction is connected with a connection cable to a control unit, with which e.g. a person in a room is thus monitored. Of course, the size of the foil construction is dimensioned according to the area to be monitored, and the webs can e.g. be placed side by side e.g. to cover the floor area of the whole room. The sensor comprises a substrate, electrically conductive areas 21, which form sensor elements, which are formed onto the substrate, and conductors 22 to connect the sensor elements to the output connector 23. The electrically conductive areas and conductors can be formed e.g. from etched copper or corresponding metal. A protective layer is on the substrate.

The sensor 2 or sensor means can be e.g. a sensor product, a type of which is presented in e.g. publication US2008238433A, (SENSOR PRODUCT FOR ELECTRIC FIELD SENSING). The sensor product can be arranged as a planar sensor and can be arranged to identify the presence or movement of people in the monitored area. The sensor can be hidden in the floor, wall or ceiling, in, on or under the surface of the structure.

In FIG. 1 sensors or sensor areas 2A, 2B, 2C, 2D are arranged in the proximity of the entrances of the elevators 1A, 1B, 1C, 1D, typically in front of the entrances. In the embodiment of the figure, the sensors are arranged in the floor, but they can also be disposed elsewhere e.g. on the ceiling or on the walls. When disposing the sensors to be utilized in the invention on the floor, they can be a part of the floor surface or they can be arranged under the floor surface.

Figure 3:
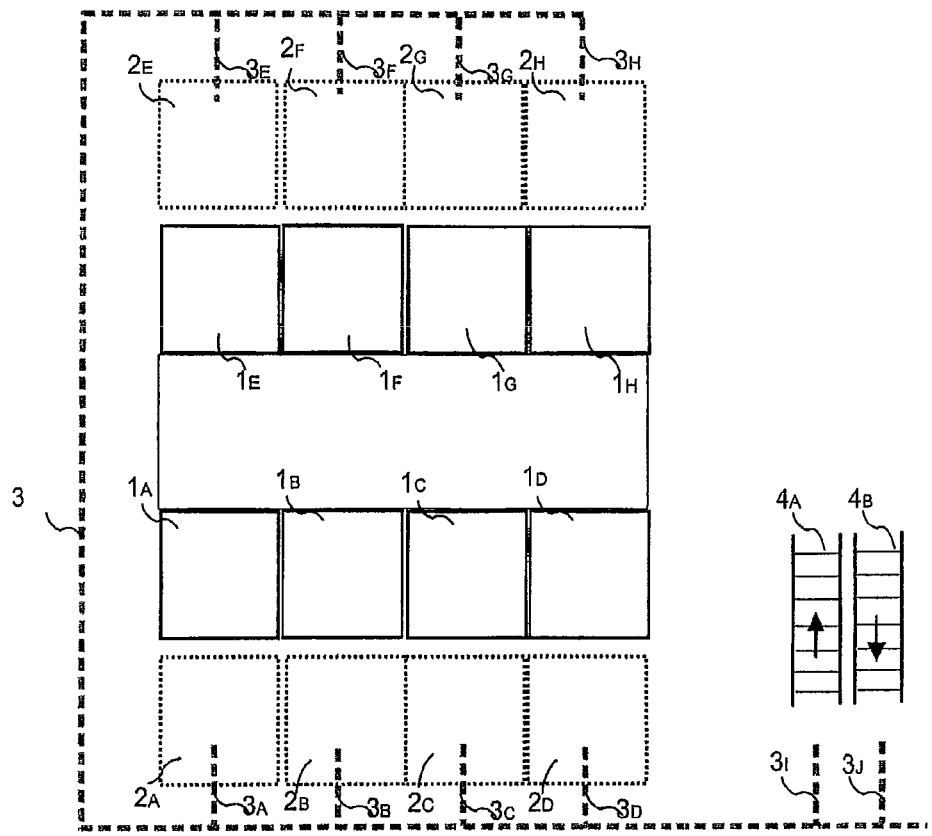
FIG. 3 presents a simplified and diagrammatic view of one arrangement according to the invention.

FIG. 3 presents one embodiment of a system that utilizes the invention, wherein passengers are directed in the elevator lobby, or corresponding space, of a building or of a vessel.

According to the invention passengers can be directed to the elevators by means of a light-source band. In addition, an elevator going in a certain direction can be notified with a certain color shown by the light-source band. For example, showing a blue color means an elevator going upwards and showing a yellow color means an elevator going downwards. Furthermore, additional indicators can be used to inform about the elevator.

According to one preferred embodiment, the first passenger coming to the floor presses the call button 5 of the elevator, in which call button the travel direction desired by the passenger can be set. In this case an indicator, such as a part 3A, 3B, 3C, 3D of the light-source band 3, and/or another display means 6A, 6B, 6C, 6D placed at the point of the elevator, shows the correct elevator to the person placing the call. At the same time the light-source band tries in a similar manner to direct the other passengers also to the point of the elevators. A sensor 2A, 2B, 2C, 2D arranged in front of the elevators 1A, 1B, 1C, 1D identifies the amount of passengers and transmits information about passenger amounts to the control system. The control system endeavors to direct passengers with means for directing passengers to divide optimally into the different elevators of the elevator group in the desired manner.

FIG. 3 presents a diagrammatic top view of a solution according to one embodiment with respect to one floor. The elevator system comprises eight elevators 1A, 1B, 1C, 1D, 1E, 1F, 1G, 1H, which are physically divided into two groups. The elevators 1A, 1B, 1C, 1D are in the first group, and the elevators 1E, 1F, 1G, 1H are in the second group. The sensors 2A . . . 2H, by means of which information about the amount of passengers waiting for elevators is obtained, are arranged n the elevator lobby in front of the elevators. In addition, there are stairs, such as escalators 4A, 4B, in the proximity of the elevator groups. Sensors can also be arranged in connection with the stairs, by means of which sensors the passenger flow carried on the stairs can be monitored. By means of the light-source band 3 it is endeavored during a period of high capacity to direct passengers optimally to the elevators 1A . . . 1H and at the upper limit of capacity it is endeavored to direct some of the passengers to use the escalators 4A, 4B. By means of the sensors of the escalators, e.g. the speed of the escalators can also if necessary be adjusted, or the escalators can be stopped if necessary if the information coming from the sensors about the movements of the passenger flow gives an indication for this.

Information about how many passengers are in the area monitored by the sensor is received from the sensors. The area monitored by a sensor can be e.g. the waiting area of each elevator in the elevator lobby, such as is presented in FIG. 1 or FIG. 3. The passengers are directed with guidance means, such as with a light-source band 3, or with other information means, to the waiting area of a suitable elevator. The sensor arranged in the waiting area gives information to the control system about the passengers waiting for each elevator. The system is fitted to direct passengers according to the capacity or according to another desired control method, e.g. a method that saves energy. In the guidance of passengers, a criterion can also be one or more performance indicators describing the quality of a transport route, which are e.g.: the utilization rate of the transport appliance of the route, travel time, waiting time, total travel time, walking distance, statistical information and personal profile. The utilization rate of a transport appliance means in this context how large a proportion of the maximum capacity of the transport appliance is in use.

The travel time of the route in this context means the time spent by a passenger on a transport appliance. The total travel time means the time that it takes a passenger to go from the signboard or from the destination call appliance to the destination point of the route. The overall travel time can be comprised of, among other things, transfer times, waiting times and/or the travel time spent on the transport appliance. Some of the times can assumed to be constant (e.g. transfer time from the signboard to the escalator) and recorded in advance in the memory of the information system. For evaluating the quality of different routes it is possible to use a so-called cost function, in which selected criteria are weighted with the desired weighting factors for calculating the so-called total cost of each route. The route option with the smallest overall cost is selected as the most suitable route, which is informed to passengers e.g. with the signboards. Cost functions are, in themselves, generally known e.g. from methods of allocation the elevators of an elevator group and they are not examined in more detail in this application.

Figure 4:
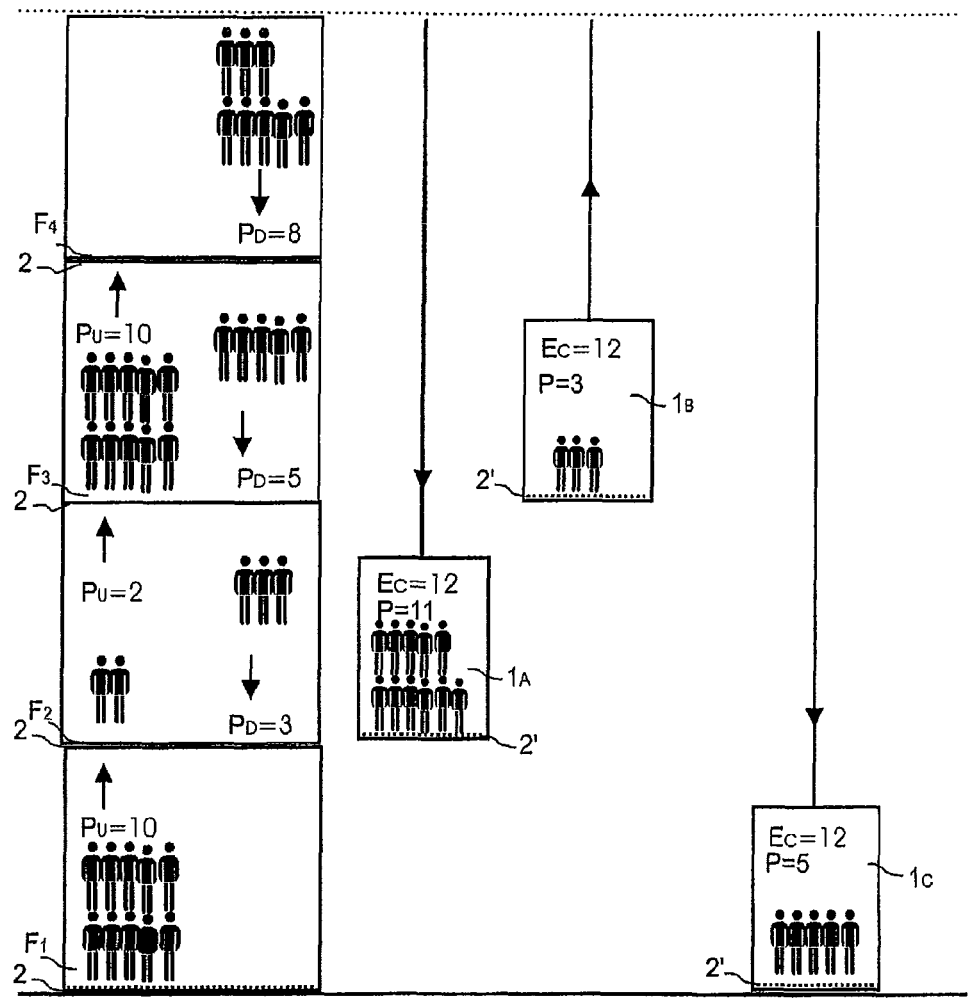
FIG. 4 presents one embodiment of the system according to the invention as a diagram.

FIG. 4 further presents a diagrammatic and simplified view of one embodiment of the solution according to the invention. In the embodiment of FIG. 4, three elevator cars 1A, 1B, 1C of the elevators of the elevator system are presented. The passenger capacity Ec of each elevator is 12 people in the embodiment of the figure. The drive apparatuses and ropings or corresponding moving means of the elevators are not presented. The elevator system has its own control system. The figure diagrammatically presents four floors F1 . . . F4 mainly in respect of the elevator lobby. A planar sensor 2 is arranged in the elevator lobby on each floor landing F1, F2, F3, F4 according to one embodiment of the invention, which in the embodiment of the figure is on the floor. As explained earlier, an indication of the numbers of people waiting for an elevator on each floor is obtained with the sensor 2. The passengers waiting for an elevator on each floor are directed to wait for the elevator at a spot according to the direction of travel, in which case information is obtained about the numbers of passengers waiting for an elevator according to the direction of travel. In FIG. 4 the passengers waiting for an elevator are marked according to whether they want to go upwards or downwards. The passengers wanting to go upwards are marked with the marking $P_U$ and correspondingly those passengers waiting for an elevator who want to go downwards with the marking $P_D$. FIG. 4 also presents a certain situation as numeric data about passenger amounts and also as a diagram. In the solution according to the invention, therefore, information is extremely accurately obtained about the quantities of passengers waiting for an elevator on the different floors, and also about the directions in which they wish to travel. The travel direction is obtained e.g. when a passenger presses a call appliance in the elevator lobby, on which call appliance the desired travel direction is indicated with e.g. an arrow. After this the passenger is directed, e.g. with a light-source band according to the embodiment of the invention or with another information means, to the waiting area of the optimal elevator. By using logical color codes appropriately, e.g. upwards blue and downwards a yellow color, the passengers coming to the elevator lobby after the first person are directed to wait for suitable elevators by means of color codes or other information appliances. Since the waiting areas of an elevator lobby are provided with sensors 2, accurate information is obtained about passengers waiting for elevators and desired travel directions on the different floors. By means of the sensors 2 of the elevator lobby, information is also obtained about whether passengers waiting for an elevator on the floor in question have for some reason left the waiting area, e.g. after choosing to use the stairs instead of the elevator. In this case the information obtained from a sensor 2 is transmitted to the control system of the elevator, on the basis of which information the elevator can bypass the floor even if the call button on the floor had been pushed. At the same time the call is removed from the system.

The system thus gives information about the quantities of passengers on different floors who are waiting for an elevator and wish to travel in different directions. This information can be used when controlling the elevators of an elevator group. The elevators can be controlled by optimizing. In this case e.g. the transport trip can be made without stops when the capacity of the elevator is at the upper limit. On the other hand, when the amount of elevator passengers is small in respect of the transport capacity of the elevator, the necessary number of stops can be made, or a passenger can even be picked up from the opposite direction with respect to the travel direction, in which case the target is the most inexpensive solution from the viewpoint of the energy requirement of the elevator.

The acceleration and braking of the elevator are optimized according to the load. The elevator is controlled to stop according to the prevailing load/capacity of the elevator and the amount of people waiting. In an elevator group, stopping at a certain floor and collecting passengers is performed with an elevator for which the collection is the most economical, especially during an off-peak period of elevator use.

On the other hand, when the number of passengers in the elevator and the capacity of the elevator are known, it is possible to e.g. bypass a floor on which many more passengers than the capacity of the elevator are waiting and to pick up, e.g. on the next floor, the amount of waiting passengers that fits in terms of elevator capacity.

Elevators are typically provided with weight sensors, which give information about the load in the elevator. However, it is not possible to determine how full the elevator is by means of the weight sensor. Owing to this the elevators 1A, 1B, 1C can also be provided with sensors 2' according to an embodiment of the invention. These give information about how many passengers are in the elevator. The sensors 2' disposed in the elevator also give information about whether a passenger has e.g. fallen, in which case the sensor according to the embodiment of the invention can be used e.g. as a part of a safety system, which gives an alarm if a person does not move in the elevator for a long time.

Furthermore, by arranging according to the embodiment of the invention a sensor in the elevator, e.g. useless calls/elevator stops caused by pointless pressings, such as by people playing in the elevator contrary to instructions, can be reduced. If, for example, there are only 1 or 2 people in the elevator and these have pressed with the call buttons of the elevator car e.g. destination floors 4-15, this information can be transmitted to the control system, which deletes the call from the register of the control system. On the other hand, if a person leaving the elevator still presses calls for one or more destinations from the call buttons of an empty elevator, the sensor gives information that the elevator is empty and the control system can delete the calls from the register.

In practice guidance is often arranged to the transport alternative that has most free transport capacity, thus generally being the fastest option at that moment. The fastest option can also be an escalator or normal stairs. The system according to the invention monitors passenger events, and if it detects that there is congestion in some elevator system (based on the information given by the sensors 2 and/or e.g. the utilization rate of a certain elevator system grows and/or total travel time grows), it directs arriving passengers to another elevator group or to some other alternative route.

The invention thus relates to a system for controlling the elevators in an elevator system, which elevator system comprises a number of elevators 1A ... 1H. The system comprises first sensor means 2, 2A ... 2H, which are arranged in the waiting area of each elevator 1A ... 1H on each floor F, F1, F2, F3 ... Fn, which sensor means 2, 2A ... 2H are fitted to give information about the presence and number of passengers waiting for an elevator at least in the waiting area in question; means for controlling the elevators, which means are fitted to receive information from the sensor means 2, 2A ... 2H about the presence and number of passengers waiting for an elevator and to control the movement of the elevators 1A ... 1H of the elevator system utilizing the information received from the sensor means 2, 2A ... 2H.

According to one preferred embodiment the system further comprises second sensor means 2', which are arranged in each elevator and are fitted to give information about the presence and number of passengers that are in the elevator.

According to one preferred embodiment the system also comprises means 3, 3A ... 3H for guiding passengers.

According to one preferred embodiment the sensor means 2, 2A ... 2H, 2' are planar sensors that operate capacitively.

According to one preferred embodiment the system further comprises means 5 at least in the elevator lobbies for giving a call to the elevator system.

According to one preferred embodiment the system comprises means 3, 3A ... 3H for guiding passengers, which means are fitted to guide passengers at least according to the desired travel direction to the waiting areas of the elevators 1A, 1B, 1C, ... 1H in the elevator lobby.

According to one preferred embodiment the guidance means 3, 3A ... 3H comprise a light-source band 3.

According to one preferred embodiment the guidance means 3 comprise light sources 30, the indication of which is used to express guidance information.

According to one preferred embodiment a sensor 2, 2A ... 2H is fitted onto the floor surface, into the floor, under the floor covering or as a part of the floor structure and/or on the ceiling surface, in the ceiling, above the ceiling covering or as a part of the ceiling structure.

According to one preferred embodiment the light-source band 3 comprises light sources 30, which are LED light sources.

According to one preferred embodiment the sensor means is a planar sensor web structure, which comprises a substrate, electrically conductive areas 21, which form sensor elements, which are formed onto the substrate, and conductors 22 to connect the sensor elements to the output connector 23, which sensor means is fitted by means of capacitive detection to monitor electrically conductive objects.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. System for controlling elevators in an elevator system, which elevator system comprises a number of elevators (1A ... 1H), the system for controlling elevators comprises:
   first planar sensors that operate capacitively (2, 2A ... 2H),
      said first planar sensors being arranged in a waiting area of each elevator (1A ... 1H) on a first floor, said first planar sensors (2, 2A ... 2H) being fitted to provide information about the presence and number of passengers waiting to go either up or down for an elevator in the waiting area on the first floor;

second planar sensors that operate capacitively arranged in a waiting area of each elevator on a second floor, said second planar sensors being fitted to provide information about the presence and number of passengers waiting to go either up or down for an elevator in the waiting area on the second floor;

additional planar sensor means that operate capacitively arranged in a waiting area of each elevator on additional floors, said additional planar sensor means being fitted to provide information about the presence and number of passengers waiting to go either up or down for an elevator in the waiting area on the additional floors; and control means for controlling the elevators, said control means being fitted to receive information from the first planar sensors (2, 2A ... 2H) about the presence and number of passengers waiting to go either up or down for an elevator on the first floor, said control means being fitted to receive information from the second planar sensors about the presence and number of passengers waiting to go either up or down for an elevator on the second floor and said control means being fitted to receive information from the additional planar sensors about the presence and number of passengers waiting to go either up or down for an elevator on the additional floors and to control the movement of the elevators (1A ... 1H) of the elevator system utilizing the information received from the first planar sensors (2, 2A ... 2H), the second planar sensors and the additional planar sensors.

2. The system according to claim 1, wherein the system further comprises elevator sensor means (2'), arranged in each elevator and fitted to give information about the presence and number of passengers that are in the elevator.

3. The system according to claim 1, wherein the system also comprises means (3) for guiding passengers.

4. The system according to claim 2, wherein the elevator sensor means (2') are planar sensors that operate capacitively.

5. The system according to claim 1, wherein the system further comprises means (5) at least in the elevator lobbies for giving a call to the elevator system.

6. The system according to claim 1, wherein the system comprises guidance means (3, 3A ... 3H), which are fitted to guide passengers at least according to the desired travel direction to the waiting areas of the elevators (1A, 1B, 1C, ... 1H) in the elevator lobby.

7. The system according to claim 6, wherein the guidance means (3, 3A ... 3H) comprise a light-source band (3).

8. The system according to claim 6, wherein the guidance means (3, 3A ... 3H) comprise light sources (30), the indication of which is used to show express information.

9. The system according to claim 1, wherein the first planar sensors (2, 2A ... 2H), the second planar sensors and the additional planar sensors are fitted onto the floor surface, into the floor, under the floor covering or as a part of the floor structure and/or on the ceiling surface, in the ceiling, above the ceiling covering or as a part of the ceiling structure.

10. The system according to claim 7, wherein the light-source band (3) comprises light sources (30), which are LED light sources.

11. The system according to claim 1, wherein the first, second and additional planar sensors are a planar sensor web structure, which comprises a substrate, electrically conductive areas (21), which form sensor elements, which are formed onto the substrate, and conductors (22) to connect the sensor elements to the output connector (23), which sensor means is fitted by means of capacitive detection to monitor electrically conductive objects.

12. The system according to claim 2, wherein the system also comprises means (3) for guiding passengers.

13. The system according to claim 2, wherein the system further comprises means (5) at least in the elevator lobbies for giving a call to the elevator system.

14. The system according to claim 3, wherein the system further comprises means (5) at least in the elevator lobbies for giving a call to the elevator system.

15. The system according to claim 4, wherein the system further comprises means (5) at least in the elevator lobbies for giving a call to the elevator system.

16. The system according to claim 2, wherein the system comprises guidance means (3, 3A ... 3H), which are fitted to guide passengers at least according to the desired travel direction to the waiting areas of the elevators (1A, 1B, 1C, ... 1H) in the elevator lobby.

17. The system according to claim 3, wherein the system comprises guidance means (3, 3A ... 3H), which are fitted to guide passengers at least according to the desired travel direction to the waiting areas of the elevators (1A, 1B, 1C, ... 1H) in the elevator lobby.

18. The system according to claim 4, wherein the system comprises guidance means (3, 3A ... 3H), which are fitted to guide passengers at least according to the desired travel direction to the waiting areas of the elevators (1A, 1B, 1C, ... 1H) in the elevator lobby.

19. The system according to claim 5, wherein the system comprises guidance means (3, 3A ... 3H), which are fitted to guide passengers at least according to the desired travel direction to the waiting areas of the elevators (1A, 1B, 1C, ... 1H) in the elevator lobby.

20. The system according to claim 16, wherein the guidance means (3, 3A ... 3H) comprise a light-source band (3).

* * * * *